United States Patent [19]

Kathawala

[11] 3,862,137
[45] Jan. 21, 1975

[54] S-TRIAZOLO(1,5-D)BENZODIAZEPIN-6(7H)-ONES
[75] Inventor: Faizulla G. Kathawala, West Orange, N.J.
[73] Assignee: Sandoz, Inc., Hanover, N.J.
[22] Filed: Mar. 5, 1973
[21] Appl. No.: 338,340

[52] U.S. Cl. ........ 260/239.3 T, 424/469, 260/308 R
[51] Int. Cl.. C07d 53/06, C07d 55/06, C07d 99/02
[58] Field of Search .............................. 260/239.3 T Primary Examiner—Henry J. Jiles
Assistant Examiner—Robert T. Bond
Attorney, Agent, or Firm—Gerald D. Sharkin; Richard E. Vila; Joseph J. Borovian

[57] ABSTRACT

S-triazolo[1,5-d][1,4]benzodiazepin-6(7H)-ones, e.g., 7-methyl-10-chloro-5H-s-triazolo[1,5-d][1,4]benzodiazepin-6(7H)-one are useful as minor tranquilizers, anti-convulsants and sleep-inducers.

24 Claims, No Drawings

S-TRIAZOLO(1,5-D)BENZODIAZEPIN-6(7H)-ONES

This invention relates to s-triazolo[1,5-d][1,4]benzodiazepin-6 (7H)-one derivatives, acid addition salts thereof, intermediates and processes for their preparation and their use as minor tranquilizers, anti-convulsants and sleep inducers.

The compounds of this invention may be represented by the following structural formula:

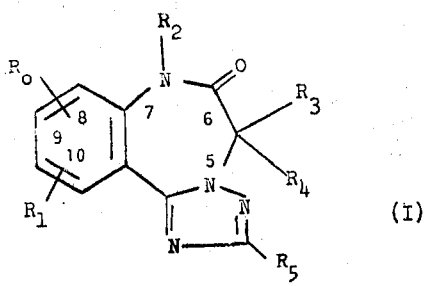

where $R_o$ and $R_1$ each independently represent hydrogen, halo having an atomic weight of about 18 to 80, lower alkyl, i.e. alkyl having 1 to 4 carbon atoms, e.g. methyl, ethyl, propyl, isopropyl and the like, provided that a least one $R_o$ and $R_1$ is halo, preferably chloro, when $R_2$ is hydrogen; and $R_2$ is hydrogen, lower alkyl as defined above; and $R_3$ is hydrogen, lower alkyl as defined above, unsubstituted phenyl or phenyl mono-substituted with halo having an atomic weight of 18 to 80, and $R_4$ is hydrogen or lower alkyl as defined above, and $R_5$ is hydrogen, lower alkyl as defined above, unsubstituted phenyl or mono-substituted phenyl as defined above.

The compounds of formula (I) may be prepared by the following reaction scheme:

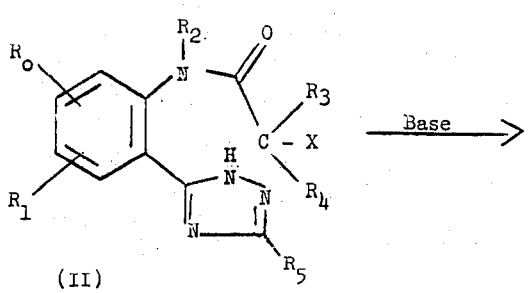

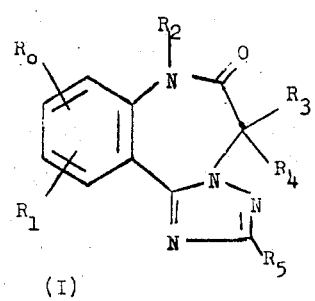

where X is halo having an atomic weight of 35 to 80, and where at least one of $R_3$ and $R_4$ is hydrogen, and the other is as previously defined, and $R_o$, $R_1$, $R_2$ and $R_5$ are as defined above.

The compounds of formula (I) may be prepared by treating a compound of the formula (II) with a strong base, such as potassium or sodium hydroxide, sodium hydride, or an alkali metal alkoxide such as potassium ethoxide or sodium ethoxide, the latter being especially preferred. The reaction is carried out in an inert polar solvent such as the lower alkanols e.g. methanol, ethanol, and the like, acetonitrile, dimethylformamide, or dimethylacetamide, preferably dimethylacetamide. Although the temperature of the reaction is not critical, it is preferred that the reaction be run from about $-10°$ to $+40°C$, more preferably from about $20°$ to $30°C$. The reaction times may typically run from about 30 to 60 hours.

The compounds of formula (II) may be prepared by the following reaction scheme:

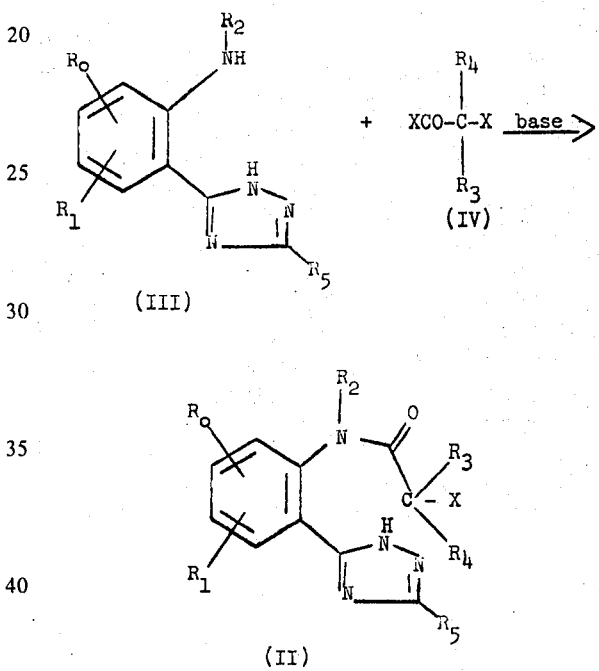

where at least one of $R_3$ and $R_4$ is hydrogen, and the other is as defined above, and $R_o$, $R_1$, $R_2$, $R_5$ and X are as defined above.

The compounds of formula (II) are prepared by treating a compound of the formula (III) with a compound of the formula (IV) preferably bromoacetylbromide, in the presence of a mild base. Suitable mild bases which may be employed in this reaction include organic bases, e.g., pyridine or inorganic bases such as sodium carbonate or potassium carbonate, the latter being especially preferred. The reaction is carried out in the presence of an inert organic solvent such as the aromatic hydrocarbons, e.g., benzene, toluene and the like, diethylether, tetrahydrofuran, preferably benzene. The temperature of the reaction is not critical, bit it is preferred that the reaction be carried out at temperatures between about $-10°C$ and $+40°C$, especially from about $20°$ to $30°C$. The reaction may typically be run from about 30 minutes to 2 hours.

According to a further aspect of this invention, the compounds of formula (I) may be prepared according to the following reaction scheme:

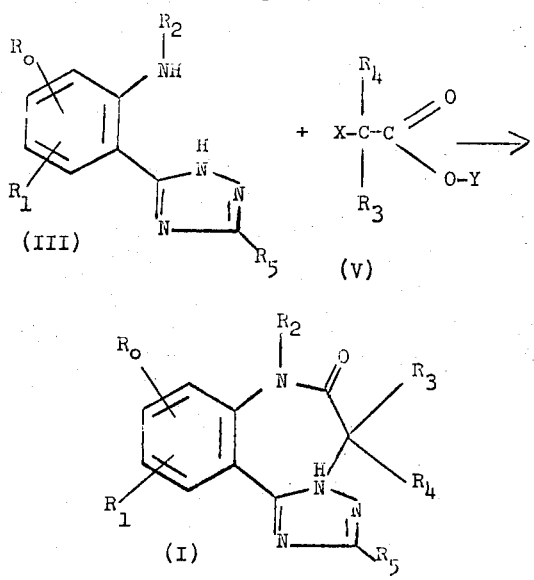

(III) + (V) →

(I)

where at least one of $R_3$ and $R_4$ is hydrogen and the other is as defined above, and Y is lower alkyl having 1 to 2 carbon atoms, and $R_0$, $R_1$, $R_2$, $R_5$ and X are as defined above.

The compounds of formula (I) are prepared by treating a compound of the formula (III) with a compound of the formula (V) in the presence of an inorganic base such as an alkali metal hydroxide, e.g. sodium hydroxide, potassium hydroxide and the like, of sodium hydride, the latter being especially preferred. The reaction is carried out in the presence of an inert organic solvent such as lower alkanols, e.g., methanol, ethanol and the like, dimethyl formamide, dimethyl acetamide or acetonitrile preferably dimethylacetamide. The temperature of the reaction is not critical, but it is preferred that the reaction be run at temperatures from about −10° to 120°C, more preferably from about 20° to 30°C. The reaction was typically run from about 30 to 60 hours.

Another aspect of this invention is the preparation of compounds of formula (I) in which $R_2$ is lower alkyl as defined above, and $R_3$ and $R_4$ are as defined above, by the following reaction scheme:

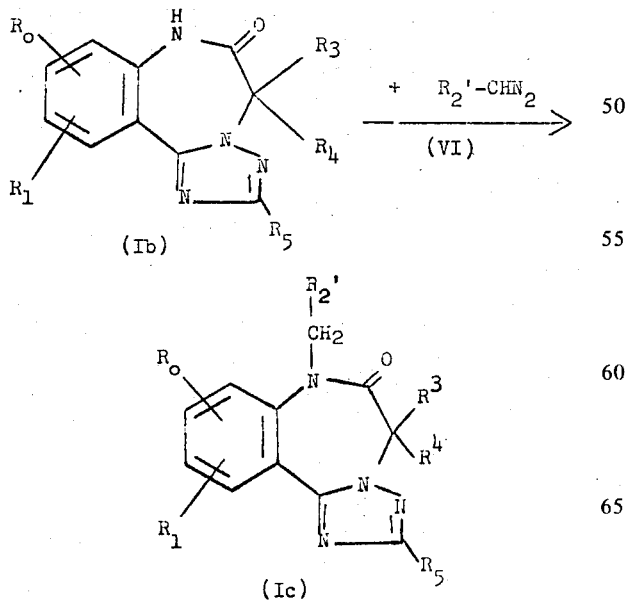

(Ib) + $R_2'$-CHN$_2$ (VI) → (Ic)

where $R_2'$ is hydrogen or lower alkyl having 1 to 3 carbon atoms and $R_0$, $R_1$, $R_3$, $R_4$ and $R_5$ are as defined above.

The compounds of formula (Ic) are prepared by treating a compound of the formula (Ib) with a diazoalkane, of the formula (VI) in the presence of an inert organic solvent such as ethers, e.g., diethyl-ether, dioxane or tetrahydrofuran, preferably diethylether or a mixture of ether and alcohol. The reaction temperature is not critical, but it is preferred that the reaction be run at temperatures from about 0° to 40°C, preferably 20° to 30°C. The reaction may typically run from about 10 to 30 hours.

The compounds of formula (I) in which $R_2$ is other than hydrogen and one or more of $R_2$, $R_3$ or $R_4$ is lower alkyl may be prepared by the following reaction scheme A:

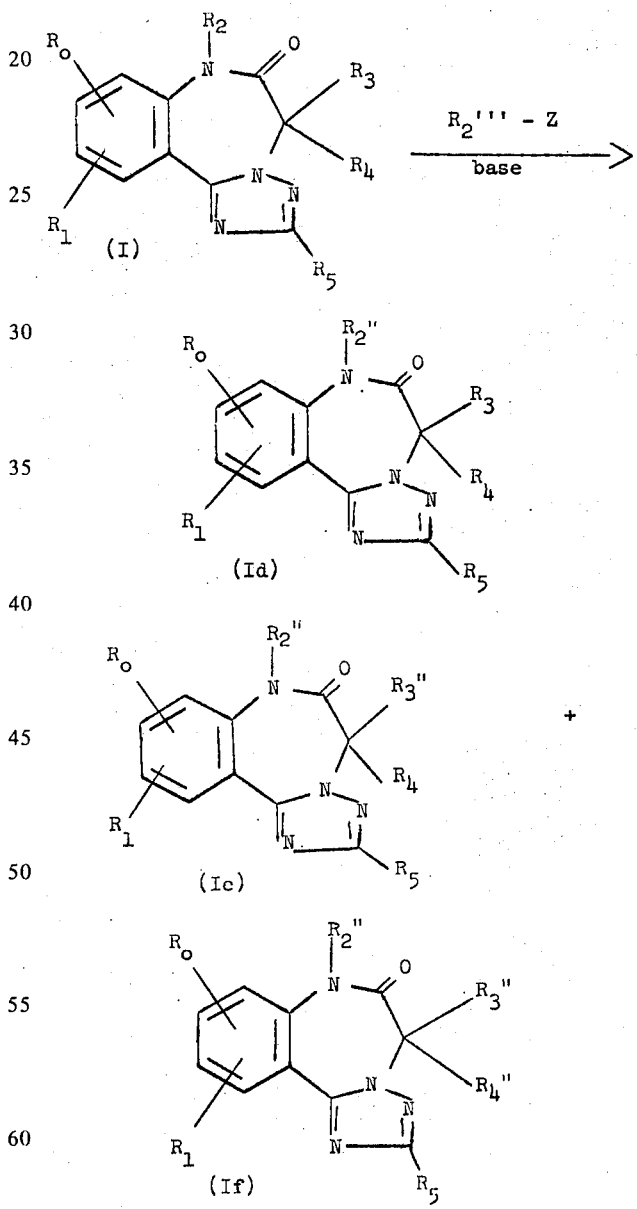

(I) $\xrightarrow[\text{base}]{R_2''' - Z}$ (Id)

(Ic) +

(If)

where $R_2'''$ is lower alkyl having 1 to 4 carbon atoms,
where $R_2''$ is the same as $R_2$, excluding hydrogen and represent $R_2'''$ when $R_2$ is hydrogen,
where each of $R_3''$ and $R_4''$ is respectively the same as $R_3$ and $R_4$ excluding hydrogen and are respectively $R_2'''$ when either of $R_3$ and $R_4$ are hydrogen, and Z is a leaving group such as chlorine, bromine, tosyl or mesyl and $R_0$, $R_1$, $R_2$, $R_3$, $R_4$, and $R_5$ are as defined above.

The compounds of formula (Id) (Ie), and (If) are prepared in the reaction scheme by treating a compound of the formula (I) with an alkylhalide of the formula $R_2'''$—Z such as methyliodide, ethyliodide, methylbromide and the like, preferably methyliodide in the presence of a base e.g., sodium hydroxide, potassium hydroxide or sodium hydride the latter being especially preferred. The reaction is carried out in the presence of an inert polar solvent such as the lower alcohols, e.g., methanol, ethanol and the like, dimethylformamide or dimethylacetamid, the latter being especially preferred. The reaction temperature is not critical, but it is preferred that the reaction be carried out between about 0° to 40°C, preferably about 20° to 30°C. In reaction scheme A, it will be evident that the maximum number of three products, i.e., products of the formula (Id), (Ie) and (If) are produced only when all of $R_2$, $R_3$ and $R_4$ in the compound (I) are hydrogen. If one of $R_2$, $R_3$ and $R_4$ is other than hydrogen, then only two of such products will, of course, be produced and one of such products if two of $R_1$, $R_2$ and $R_3$ are other than hydrogen. My observations of the reaction of reaction scheme A indicate that the 7-position nitrogen atom and 5-position carbon are both highly receptive to reaction with the alkyl halide, and that the use of even the lower mol ratios of the alkyl halide and Base (e.g., sodium hydride) to compound (I) will result in mixture of the products which can be formed in view of the definition of $R_2$, $R_3$ and $R_4$ in the compound (I). It will, however, be evident that the ratio in which the products of the formulae (Id), (Ie) and/or (If) are formed will depend upon known variables, particularly the reaction time and the mol ratio of the alkyl halide and Base (e.g., sodium hydride), to compound, and that the higher mol ratios and very extended reaction times may be employed to produce a reaction product which is largely or essentially exclusively a compound of the formula (I) in which all of the positions, $R_2$, $R_3$ and $R_4$ are other than hydrogen.

The compounds of formulas (I), (Ib), (Ic), (Id), (Ie), (If) and (II) may be recovered using conventional techniques such as crystallization, filtration or column chromatography.

Certain of the compounds of the formulas (III), (IV), (V), and (VI) are known and may be prepared by methods disclosed in the literature. Those compounds (III), (IV), (V), and (VI) not specifically disclosed may be prepared by analogous methods from known starting materials.

The compounds of formula (I) possess pharmacological activity. In particular, they possess central nervous system depressant activity, particularly minor tranquilizing and anti-convulsant activity as indicated 1) by their ability to produce docility in behavior tests in mice given 50 to 250 mg/kg i.p. of the test compound according to the 30-word adjective check sheet system, basically as described by S. Irwin, Gordon Research Conference, Medicinal Chemistry, 1959 and Chem., Symposium on Sedative and Hypnotic Drugs, Williams and Wilkins, 1954; 2) by the hexobarbital reinduction method of Winter, J. Pharmacol, and Exp. Therap., 94, 7–11, 1948 and (3) by their ability to antagonize tonic convulsions and death in mice given 50 to 250 mg/kg, i.p. of the test compound followed 1 hour later by 50 mg/kg i.p. of N-sulfamoylazepine.

The compounds of formula (I) in which $R_2$ is alkyl are also useful as sleep inducing agents as indicated in Cebus monkey using chronically implanted electrodes. Brain readings are obtained via a 10 or 16 channel electroencephalagraph.

For the recording sessions, the monkeys are restrained by neck and waist plates in chairs in full side observation cages at the same time every night for 13½ hours Monday through Thursday. Gross behavior is monitored via closed circuit television and video tape recordings.

The compound of formula (I) is administered p.o. immediately on placing the monkey in the observation cages with at least 7 days intervening between drug administration. Physiological saline is administered via a similar route and at the same times on all control runs.

Control data are collected at least 3 days per week and accumulated to give control data for 15 sessions per monkey Data from each session are statistically compared via computer analysis to the previous 5–15 control sessions for the particular animal, with particular emphasis given to the following phases of the sleep-wakefulness cycle: resting awake, light sleep, deep sleep, paradoxical (REM) sleep, "pseudo-" paradoxical sleep, latency to onset of deep sleep, and latency to onset of first epoch of paradoxical sleep.

For such usage, the compounds of formula (I) may be administered orally or parenterally as such or admixed with conventional pharmaceutical carriers. They may be administered orally in such forms as tablets, dispersible powders, granules, capsules, syrups and elixirs, and parenterally as solutions e.g., a sterile injectable aqueous solution. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose, and talc, granulating and disintegrating agents, e.g., starch and alginic acid, binding agents, e.g., starch, gelatin and acacia, and lubricating agents, eg., magnesium stearate, stearic acid and talc. The tablets may be uncoated or coated by known techniques to delay disintegration and absorption in the gastrointestinal tract and thereby provide a sustained action over a longer period. Similarly, suspensions, syrups, and elixirs, may contain the active ingredient in admixture with any of the conventional excipients utilized for the preparation of such compositions, e.g., suspending agents (lecithin, polyoxyethylene stearate and polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art. All these pharmaceutical preparations may contain up to about 90% of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acids salts, such as the hydrochloride, hydrobromide, sulfate and phosphate and the like and the organic acid salts such as succinate, benzoate, acetate, p-toluenesulfonate, benzenesulfonate, and the like.

For the above indicated use as a minor tranquilizer and as an anti-convulsant, the dosage of compound (I) will vary depending upon the mode of administration utilized and the particular compound employed. However, in general, satisfactory results are obtained when the compounds are administered at a daily dosage of from about 4 milligrams to 200 milligrams per kilogram of animal body weight. This daily dosage is preferably given in divided doses, e.g., 2 to 4 times a day, or in sustained release form. For most large mammals, the total daily dosage is from about 300 to 3,000 milligrams, and dosage forms suitable for internal administration comprise from about 75 milligrams to about 1,500 milligrams of the compound in admixture with a solid or liquid pharmaceutical carrier or diluent.

The sleep inducing effective dosage of the compounds of the formula (I) will vary depending on the particular compound employed. However, in general, satisfactory results are obtained when the compounds are administered orally at a daily dosage of from about 2 milligrams to about 100 milligrams per kilogram of animal body weight, typically given in a single dose at bedtime. For most large mammals, the total daily dosage is from about 150 to about 1,000 milligrams, preferably at bedtime and dosage forms suitable for internal administration comprise from about 75 to about 500 milligrams of the compound in admixture with a solid or liquid pharmaceutical carrier or diluent. The preferred pharmaceutical compositions from the standpoint of preparation and ease of administration are solid compositions, particularly hard-filled capsules and tablets.

Tablets and capsules containing the ingredients indicated below may be prepared by convention techniques and are useful as sleep inducers at a dose of one or two tablets just before bedtime.

| Ingredients | Weight (mg) tablet | capsule |
|---|---|---|
| 7-methyl-10-chloro-5H-s-triazolo-[1,5-d][1,4]-benzodiazepin-6(7H)-one. | 200 | 200 |
| tragacanth | 10 | — |
| lactose | 247.5 | 300 |
| corn starch | 25 | — |
| talcum | 15 | — |
| magnesium stearate | 2.5 | — |
| Total | 500 mg. | 500 mg. |

EXAMPLE 1

10-chloro-5H-s-triazolo[1,5-d][1,4]benzodiazepin-6(7H)-one

To a solution of 60 grams of 3-(2'-amino-5'-chlorophenyl)-s-triazole in 600 ml of dimethylacetamide, there is added at ice-bath temperature, 16 grams of sodium hydride and the mixture is stirred for 2 hours. Thereafter, 60 grams of ethylbromoacetate in 150 ml N,N-dimethyl-acetamide is added dropwise; the reaction mixture being kept at ice bath temperature during the addition. The reaction mixture is then gradually allowed to warm up to room temperature and stirred for a period of 48 hours. Thereafter the dimethylacetamide is removed in vacuo and the resulting residue is dissolved in water. The pH of the solution made neutral (7.0) by small additions of hydrochloric acid and extracted several times with ethylacetate. The combined ethylacetate extracts are washed 2 times with water, dried over sodium sulfate, filtered and evaporated in vacuo to dryness. The residue from the above is then chromatographed on silica gel. Elution is started with methylene chloride and subsequently with methylene chloride containing increasing amounts of methanol. The fractions containing 10-chloro-5H-s-triazolo[1,5-d][1,4]benzodiazepin-6(7H)-one are combined. The solvents are removed in vacuo and the product is recrystallized from ether to give 10-chloro-5H-s-triazolo[1,5-d][1,4]benzodiazepin-6(7H)-one, m.p. 225°–227°C.

Following the above procedure and using in place of 3-(2'-amino-5'-chlorophenyl)-s-triazole an equivalent amount of a) 3-(2'-amino-5'-chlorophenyl)-5-methyl-s-triazole.
b) 3-(2'-amino-5'-chlorophenyl)-5-(o-chlorophenyl)-s-triazole,
c) 3-(2'-amino-5'-tolyl)-s-triazole,
d) 3-(2'-amino-4',5'-dichlorophenyl)-s-triazole, or
e) 3-(2'-methylamino-5'-chlorophenyl)-s-triazole, there is obtained
c) 3-(2'-α-bromoacetylamino-5'-methyl)-s-triazole,
d) 3-(2'-α-bromoacetylamino-4',4'-dichloro-s-triazole, and
e) 3-(2'-N-methyl-α-bromoacetylamino-5'-chlorophenyl)-s-triazole, respectively.

Step b: 10-chloro-2-methyl-5H-s-triazolo[1,5-d][1,4]benzodiazepin-6(7H)-one

A solution of sodium ethoxide is prepared by dissolving 4.9 grams of sodium in 500 ml absolute ethanol. To this solution there is then added 56.3 gms of 3-(2'-α-bromoacetylamino-5'-chlorophenyl)-5-methyl-s-triazole in 1,800 ml of N-N-dimethylacetamide over a period of 5 to 6 hours dropwise. The reaction mixture is then allowed to stir at room temperature for 48 hours.

Thereafter the solvents are removed in vacuo, the residue treated with water, solution brought to pH 7.0 and extracted several times with ethylacetate. The combined ethylacetate extracts are washed 3 times with water, dried over sodium sulphate, filtered and evaporated in vacuo to dryness. The residue is treated with pentane/ether to give the first crop of solids. These solids are crystallized from methylene chloride to give 4.0 gms of 2-methyl-10-chloro-5-H-s-triazolo[1,5-d][1,4]benzodiazepin-6(7H)-one m.p. 225°–58°C.

Following the above procedure and using in place of 3-(2'-α-bromoacetylamino-5'-chlorophenyl)-5-methyl-s-triazole, an equivalent amount of a) 3-(2'-α-bromoacetylamino-5'-chlorophenyl)-s-triazole,
b) 3-(2'-α-bromoacetylamino-5'-chlorophenyl-5-o-chlorophenyl-s-triazole,
c) 3-(2'-α-bromoacetylamino-5'-tolyl)-s-triazole,
d) 3-(2'-α-bromoacetylamino-4', 5'-dichlorophenyl)-s-triazole, or
e) 3-(2'-N-methyl-α-bromoacetylamino-5'-chlorophenyl)-s-triazole, there is obtained
a) 10-chloro-5H-s-triazolo[1,5-d][1,4]benzodiazepin-6(7H)-one, b) 10-chloro-2-(o-chlorophenyl)-5H-s-triazolo[1,5-d][1,4]benzodiazepin-6(7H)-one,
c) 10-methyl-5H-s-triazolo[1,5-d][1,4]benzodiazepin-6(7H)-one,
d) 9,10-dichloro-5H-s-triazolo[1,5-d][1,4]benzodiazepin-6(7H)-one, and
e) N-methyl-10-chloro-s-triazolo[1,5-d][1,4]benzodiazepin-6(7H)-one respectively.

a) 10-chloro-2-methyl-5H-s-triazole[1,5-d][1,4]benzodiazepin-6(7H)-one,
b) 10-chloro-2-o-chlorophenyl-5H-s-triazolo[1,5-d][1,4]benzodiazepin-6(7H)-one,
c) 10-methyl-5H-s-triazolo[1,5-d][1,4]benzodiazepin-6(7H)-one,
d) 9,10-dichloro-5H-s-triazolo[1,5-d][1,4]benzodiazepine-6(7H)-one, and
e) 7-methyl-10-chloro-5H-s-triazolo[1,5-d][1,4]benzodiazepin-6(7H)-one, respectively.

EXAMPLE 2

Step a: 3-(2'-α-bromoacetylamino-5'-chlorophenyl)-5-methyl-s-triazole

To a solution of 60 gms. of 3-(2'-amino-5'-chlorophenyl)-5-methyl-s-triazole in 1500 ml absolute tetrahydrofuran there is added 20 gms. of anhydrous potassium carbonate and then a solution of 48 gms of bromoacetylbromide in 50 ml tetrahydrofurane dropwise. After the addition, the reaction mixture is stirred at room temperature for 1 hour. Thereafter, the reaction mixture is evaporated in vacuo, the residue treated with water and then with small portions of 10% sodium hydroxide solution until the pH of the solution if 7.0. The resultant mixture is then extracted with methylenechloride and the first amount of desired material which began to crystallize is filtered off, washed well with water and methylene chloride. The methylene chloride extracts are combined, washed three times with water, dried over sodium sulphate, filtered and evaporated in vacuo to dryness. The residue is crystallized from ether and 32 gms. of 3-(2'-α-bromoacetylamino-5'-chlorophenyl)-5-methyl-s-triazole is obtained.

Following the above procedure and using in place of 3-(2'-amino-5'-chlorophenyl)-5-methyl-s-triazole an equivalent amount of
a) 3-(2'-amino-5'-chlorophenyl)-s-triazole,
b) 3-(2'-amino-5'-chlorophenyl)-5-(o-chlorophenyl)-s-triazole,
c) 3-(2'-amino-5'-tolyl)-s-triazole,
d) 3-(2'-amino-4',5'-dichlorophenyl)-s-triazole, or
e) 3-(2'-methylamino-5'-chlorophenyl)-s-triazole,
there is obtained
a) 3-(2'-α-bromoacetylamino-5'-chlorophenyl)-s-triazole,
b) 3-(2'-α-bromoacetylamino-5'-chlorophenyl)-5-o-chlorophenyl-s-triazole, Step b: 10-chloro-2-methyl-5H-s-triazolo[1,5-d][1,4]benzodiazepin-6(7H)-one A solution of sodium ethoxide is prepared by dissolving 4.9 grams of sodium in 500 ml absolute ethanol. To this solution is then added 56.3 gms of 3-(2'-α-bromoacetylamino-5'-chlorophenyl)-5-methyl-s-triazole in 1800 ml of N-N-dimethylacetamide over a period of 5 to 6 hours dropwise. The reaction mixture is then allowed to stir at room temperature for 48 hours.

Thereafter the solvents are removed in vacuo, the residue treated with water, solution brought to pH 7.0 and extracted several times with ethylacetate. The combined ethylacetate extracts are washed 3 times with water, dried over sodium sulphate, filtered and evaporated in vacuo to dryness. The residue is treated with pentane/ether to give the first crop of solids. These solids are crystallized from methylene chloride to give 4.0 gms of 2-methyl-10-chloro-5-H-s-triazolo[1,5-d][1,4]benzodiazepin-6(7H)-one m.p. 225°–58°C.

Following the above procedure and using in place of 3-(2'-α-bromoacetylamino-5'-chlorophenyl)-5-methyl-s-triazole, an equivalent amount of
a) 3-(2'-α-bromoacetylamino-5'-chlorophenyl)-s-triazole,
b) 3(2'-α-bromoacetylamino-5'-chlorophenyl-5-o-chlorophenyl-s-triazole,
c) 3-(2'-α-bromoacetylamino-5'-tolyl)-s-triazole,
d) 3-(2'-α-bromoacetylamino-4',5'-dichlorophenyl)-s-triazole, or
e) 3-(2'-N-methyl-α-bromoacetylamino-5'-chlorophenyl)-s-triazole, there is obtained
a) 10-chloro-5H-s-triazolo[1,5-d][1,4]benzodiazepin-6(7H)-one,
b) 10-chloro-2-(o-chlorophenyl)-5H-s-triazolo[1,5-d][1,4]benzodiazepin-6(7H)-one,
c) 10-methyl-5H-s-triazolo[1,5-d][1,4]benzodiazepin-6(7H)-one,
d) 9,10-dichloro-5H-s-triazolo[1,5-d][1,4]benzodiazepin-6(7H)-one, and e) N-methyl-10-chloro-s-triazolo[1,5-d][1,4]benzodiazepin-6(7H)-one respectively.

EXAMPLE 3

7-methyl-10-chloro-5H-s-triazolo[1,5-d][1,4]benzodiazepin-6(7H)-one

To a solution of 2 grams of 10-chloro-5H-s-triazolo-[1,5-d][1,4]benzodiazepin-6(7H)-one in 250 ml methanol there is added a solution of freshly prepared diazomethane in 100 ml ether (diazomethane prepared from 16.8 gms. N-nitrosomethylure at room temperature) and the solution is stirred at room temperature for 18 hours. Excess diazomethane is then decomposed by addition of acetic acid and solvents are removed in vacuo. The residue is then treated with 2N-sodium carbonate solution until the pH of the mixture is 7.0 and then extracted several times with ethyl acetate. The combined ethyl acetate extracts are washed 3 times with water, dried over sodium sulfate and filtered. The solvent is evaporated in vacuo and the residue is then chromatographed on silica gel with chloroform containing increasing amounts of methanol. The fractions are collected and the solvents are evaporated in vacuo. The residue is recrystallized from ether to give 1.2 gm of 7-methyl-10-chloro-5H-s-triazolo [1,5-d][1,4]benzodiazepin-6(7H)-one m.p. 140°–144°.

EXAMPLE 4

10-chloro-7-methyl-5H-s-triazolo[1,5-d][1,4]benzodiazepin-6(7H)-one and 10-chloro-5,7-dimethyl-5H-s-triazolo[1,5-d][1,4]benzodiazepin-6(7H)-one and 10-chloro-5,5,7-trimethyl-5H-s-triazolo[1,4-d][1,4]benzodiazepin-6(7H)-one.

To a solution of 4.7 grams of 10-chloro-5H-s-triazolo[1,5-d][1,4]benzodiazepin-6(7H)-one in 50 ml of N-N-dimethylacetamide there is added 1.92 grams of 57% sodium hydride dispersed in mineral oil; and the reaction mixture is stirred at room temperature for 1 hour. Thereafter, there is added 3 ml. methyliodide, and the mixture is stirred at room temperature for 2 hours. The solvent is then removed in vacuo and the residue is dissolved with water. The pH is adjusted to 7.0 and the mixture is extracted several times with ethyl acetate. The combined ethyl acetate extracts are washed 3 times with water, dried over sodium sulfate, and filtered. The solvent is evaporated in vacuo and the residue is then very carefully chromatographed on silica gel with methylene chloride containing increasing amounts of methanol. The fractions are collected and the solvents removed in vacuo to obtain the following products:

10-chloro-7-methyl-5H-s-triazolo[1,5-d][1,5]benzodiazepin-6(7H)-one, m.p. 140°–144°C.

10-chloro-5,7-dimethyl-5H-s-triazolo[1,5-d][1,4]benzodiazepin-6(7H)-one mp 138°–142°C.

10-chloro-5,5,7-trimethyl-5H-s-triazolo[1,5-d][1,4]benzodiazepin-6(7H)-one m.p. 173°–174°C.

Following the above procedure, there may be obtained a) 10-chloro-2,7-dimethyl-5H-s-triazolo[1,5-d][1,4]benzodiazepin-6(7H)-one, m.p. 133°–135°C.

b) 10-chloro-2,5,7-trimethyl-5H-s-triazolo[1,5-d][1,4]benzodiazepin-6(7H)-one m.p. 130°–135°C, and c) 10-chloro-2,5,6,7-tetramethyl-5H-s-triazolo[1,5-d][1,4]benzodiazepin-6(7H)-one, m.p. 140°–143°C, respectively.

What is claimed is:

1. A compound of the formula

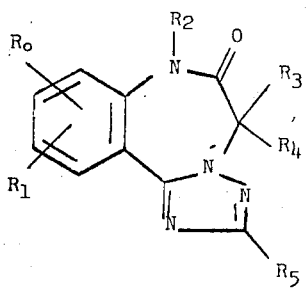

wherein $R_o$ and $R_1$ each independently represent hydrogen, halo having an atomic weight of about 18 to 80, alkyl of 1 to 4 carbon atoms, provided that at least one of $R_o$ and $R_1$ is halo, preferably chloro, when $R_2$ is hydrogen, and $R_2$ is hydrogen, alkyl of 1 to 4 carbon atoms, and $R_3$ is hydrogen, alkyl of 1 to 4 carbon atoms, unsubstituted phenyl or phenyl mono-substituted with halo having an atomic weight of 18 to 80

$R_4$ is hydrogen or alkyl of 1 to 4 carbon atoms, and $R_5$ is hydrogen, alkyl of 1 to 4 carbon atoms, unsubstituted phenyl or mono-substituted phenyl as defined above.

2. A pharmaceutically acceptable acid addition salt of a compound of claim 1.

3. A compound of the formula

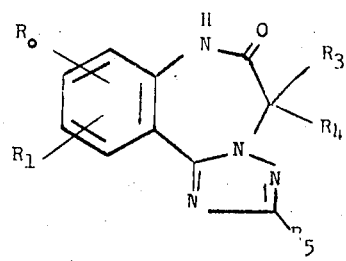

where $R_o$, $R_1$, $R_3$, $R_4$ and $R_5$ are as defined in claim 1, or a pharmaceutically acceptable acid addition salt thereof.

4. A compound of the formula

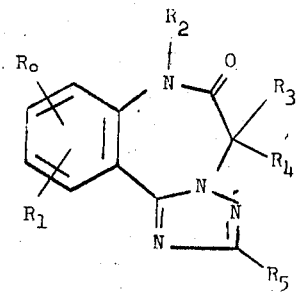

where ol, $R_2$ is lower alkyl of 1 to 4 carbon atoms, and $R_o$, $R_1$, $R_3$, $R_4$ and $R_5$ are as defined in claim 1 or a pharmaceutically acceptable acid addition salt thereof.

5. A compound of the formula

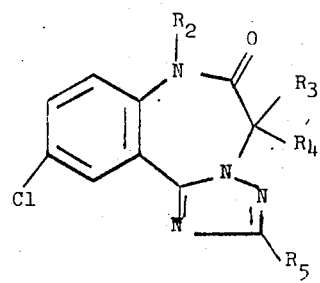

where $R_2$, $R_3$, $R_4$ and $R_5$ are as defined in claim 1, or a pharmaceutically acceptable acid addition salt thereof.

6. A compound of the formula

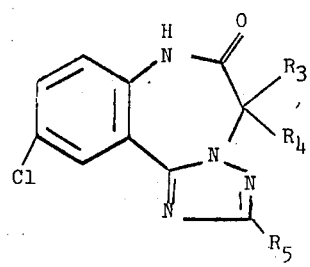

where $R_3$, $R_4$ and $R_5$ are as defined in claim 1, or a pharmaceutically acceptable acid addition salt thereof.

7. A compound of the formula

13

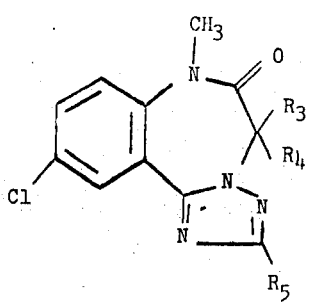

where
R₃, R₄ and R₅ are as defined in claim 1, or a pharmaceutically acceptable acid addition salt thereof.

8. A compound of the formula

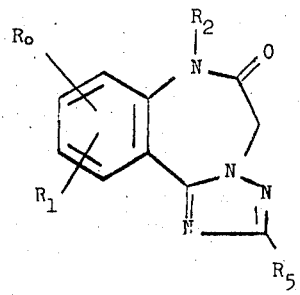

where
R₀, R₁, R₂ and R₅ are as defined in claim 1, or a pharmaceutically acceptable acid addition salt thereof.

9. A compound of the formula

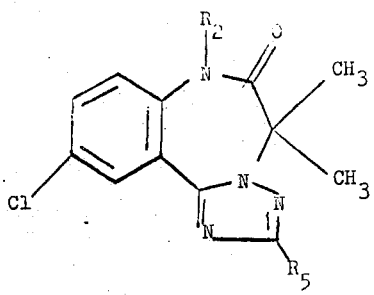

where
R₂ is alkyl of 1 to 4 carbon atoms, and
R₅ is as defined in claim 1, or a pharmaceutically acceptable acid addition salt thereof.

10. A compound of the formula

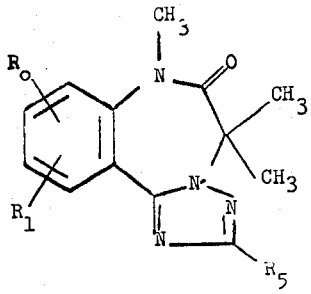

where
R₀, R₁ and R₅ are as defined in claim 1, or a pharmaceutically acceptable acid addition salt thereof.

11. The compound of claim 1 which is 10-chloro-5H-s-triazolo [1,5-d][1,4]benzodiazepin-6(7H)-one.

12. The compound of claim 1 which is 10-chloro-2-methyl-5H-triazolo[1,5-d][1,4]benzodiazepin-6(7H)-one.

14

13. The compound of claim 1 which is 10-chloro-7-methyl-5H-s-triazolo[1,5-d][1,4]benzodiazepin-6(7H)-one.

14. The compound of claim 1 which is 5,7-dimethyl-10-chloro-5H-s-triazolo[1,5-d][1,4]benzodiazepin-6(7H)-one.

15. The compound of claim 1 which is 10-chloro-5,5,7-trimethyl-5H-s-triazolo[1,5-d][1,4]benzodiazepin-6(7H)-one.

16. A process for preparing a compound of claim 1 which comprises the step of reacting a compound of the formula

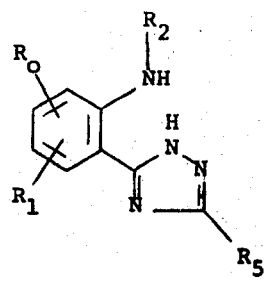

with a compound of the formula:

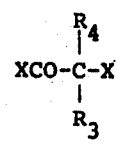

in the presence of a mild base and an inert organic solvent to obtain an intermediate of the formula:

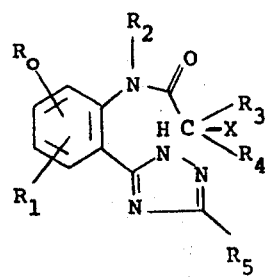

and thereafter reacting said intermediate with a strong base in the presence of an inert polar solvent
wherein
at least one of R₃ and R₄ is hydrogen and the other is as defined above, and
each x is independently halo having an atomic weight of 35 to 80, and
R₀, R₁, R₂ and R₅ are as defined in claim 1.

17. A process for preparing a compound of claim 1 which comprises the step of reacting a compound of the formula:

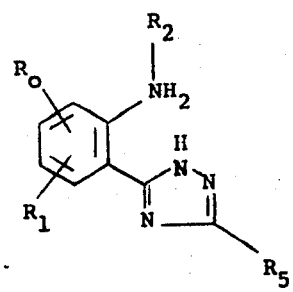

with a compound of the formula:

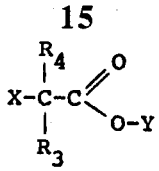

in the presence of an inorganic base and an inert organic solvent, wherein at least one of $R_3$ and $R_4$ is hydrogen and the other is as defined above, and X is halo having an atomic weight of 35 to 80, and Y represents alkyl of 1 to 2 carbon atoms, and $R_o$, $R_1$, $R_2$ and $R_5$ are as defined in claim 1.

18. A process for preparing a compound of claim 1 in which $R_2$ is lower alkyl which comprises the step of reacting a compound of the formula

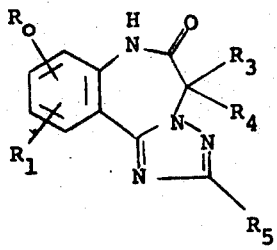

with a diazoalkane of the formula $$R_2'-CHN_2,$$

in the presence of an inert organic solvent where $R_o$, $R_1$, [$R_2$,] $R_3$, $R_4$ and $R_5$ are as defined in claim 1 and

[$R'_2$] $R_2'$ is hydrogen or lower alkyl having 1 to 3 carbon atoms.

19. A process for preparing a compound of the formula

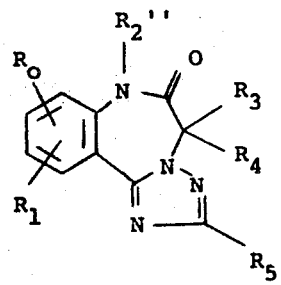

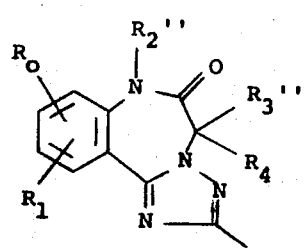, and

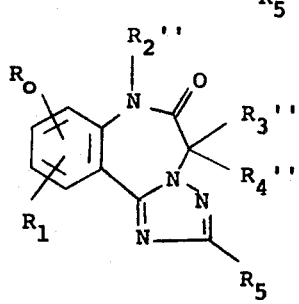

which comprises the step of reacting a compound of the formula

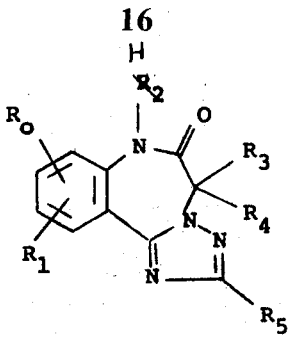

with an alkyl halide of the formula $$R_2'''-Z$$

in the presence of a base and an inert polar solvent wherein $R_o$, $R_1$, $R_2$, $R_3$, $R_4$ and $R_5$ are as defined in claim 1, $R_2'''$ is lower alkyl having 1 to 4 carbon atoms, $R_2''$ is the same as $R_2$, excluding hydrogen and represents $R_2'''$ when $R_2$ is hydrogen, each of $R_3''$ and $R_4''$ is respectively the same as $R_3$ and $R_4$ excluding hydrogen and is respectively $R_2'''$ when either of $R_3$ and $R_4$ are hydrogen, and Z is a leaving group.

20. The compound of claim 1 which is 10-chloro-2,7-dimethyl-5H-s-triazolo[1,5-d] [1,4]-benzodiazepin-6(7H)-one.

21. The compound of claim 1 which is 10-chloro-2,5,7-trimethyl-5H-s-triazolo [1,5-d] [1,4]benzodiazepin-6(7H)-one.

22. The compound of claim 1 which is 10-chloro-2,5,6,7-tetramethyl-5H-s-triazolo [1,5-d] [1,4]benzodiazepin-6(7H)-one.

23. A compound of the formula

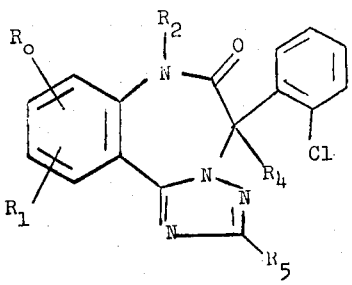

where $R_o$, $R_1$, $R_2$, $R_4$ and $R_5$ are as defined in claim 1, or a pharmaceutically acceptable acid addition salt thereof.

24. A compound of the formula

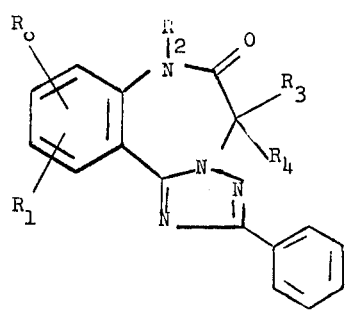

where $R_o$, $R_1$, $R_2$, $R_3$ and $R_4$ are as defined in claim 1, or a pharmaceutically acceptable acid addition salt thereof.

* * * * *